US012739793B2

(12) United States Patent
Li et al.

(10) Patent No.: US 12,739,793 B2
(45) Date of Patent: Sep. 15, 2026

(54) METHOD FOR RESOURCE SELECTION, AND APPARATUS, AND USER EQUIPMENT USING THE SAME

(71) Applicant: DATANG GOHIGH INTELLIGENT AND CONNECTED TECHNOLOGY (CHONGQING) CO., LTD., Chongqing (CN)

(72) Inventors: Chenxin Li, Chongqing (CN); Rui Zhao, Chongqing (CN)

(73) Assignee: DATANG GOHIGH INTELLIGENT AND CONNECTED TECHNOLOGY (CHONGGOING) CO., LTD., Chogqing (CN)

( * ) Notice: Subject to any disclaimer, the term of this patent is extended or adjusted under 35 U.S.C. 154(b) by 261 days.

(21) Appl. No.: 18/286,408

(22) PCT Filed: Apr. 18, 2022

(86) PCT No.: PCT/CN2022/087338
§ 371 (c)(1),
(2) Date: Oct. 11, 2023

(87) PCT Pub. No.: WO2022/237455
PCT Pub. Date: Nov. 17, 2022

(65) Prior Publication Data

US 2024/0244584 A1 Jul. 18, 2024

(30) Foreign Application Priority Data

May 10, 2021 (CN) ......................... 202110506370.2

(51) Int. Cl.
*H04W 72/02* (2009.01)
*H04W 28/26* (2009.01)
(Continued)

(52) U.S. Cl.
CPC ........... *H04W 72/02* (2013.01); *H04W 28/26* (2013.01); *H04W 72/0446* (2013.01); *H04W 72/563* (2023.01)

(58) Field of Classification Search
CPC ... H04W 72/02; H04W 72/563; H04W 28/26; H04W 72/0446
See application file for complete search history.

(56) References Cited

U.S. PATENT DOCUMENTS

2023/0224871 A1* 7/2023 Ding ....................... H04W 4/46 370/329

FOREIGN PATENT DOCUMENTS

| | | | |
|---|---|---|---|
| CN | 111246426 | A | 6/2020 |
| CN | 112261613 | A | 1/2021 |
| JP | 2017-208796 | A | 11/2017 |

OTHER PUBLICATIONS

International Search Report for Application No. PCT/CN2022/087338, mailed Jul. 11, 2022, (6 pages).

(Continued)

*Primary Examiner* — Michael Thier
*Assistant Examiner* — Nevena Zecevic Sandhu
(74) *Attorney, Agent, or Firm* — NIXON PEABODY LLP; Jeffrey L. Costellia

(57) ABSTRACT

The present disclosure relates to the technical field of direct communications. Disclosed are a sidelink resource selection method and apparatus, and a user equipment. The method is applied to the user equipment, and comprises: in a condition that a service packet is arrived or to be arrived, determining whether resource selection/reselection needs to be triggered.

15 Claims, 3 Drawing Sheets

(51) Int. Cl.
*H04W 72/0446* (2023.01)
*H04W 72/563* (2023.01)

(56) References Cited

OTHER PUBLICATIONS

Intel Corporation, "Design of Resource Allocation Mode-2 for NR V2X Sidelink Communication", 3GPP TSG RAN WGI Meeting #99 R1-1912205, Nov. 9, 2019, section 2, pp. 1-32.
Fujitsu, " Considerations on Partial Sensing and DRX in NR Sidelink", 3GPP TSG RAN WGI Meeting #104b-e R1-2102719, Apr. 6, 2021, Sections 2 and 3, pp. 1-18.
Japanese Office Action in Japanese Patent Application JP-2023-569911 with English Translation, mailed Apr. 10, 2025 (6 pages).
Office Action for Chinese Patent Application CN202110506370.2, mailed Jan. 20, 2025, (23 pages).
Extended European Search report for European Patent Application EP22806425.9 mailed Feb. 25, 2025, (10 pages).
Interdigital et al. "Sidelink Resource Allocation for Power Saving", 3rd Generation Partnership Draft, R1-2103537, Apr. 6, 2021; https://ftp.3gpp.org/tsg_ran/WG1_RL1/TSGR1_104b-e/Docs/R1-2103537.zipR1-2103537_Resource-allocation-for-power-saving.docx (9 pages).
Intel Corporation: "Sidelink Power Saving Solutions", 3rd Generation Partnership Project Draft: R1-2103048, Apr. 7, 2021; https://ftp.3gpp.org/tsg_ran/WG1_RL1/TSGR1_104b-e/Docs/R1-2103048.zip_R1-2103048-Intel-eV2X-Power-Saving.docx (17 pages).
Apple: "Discussion on Sidelink Resource Allocation for Power Saving", 3rd Generation Partnership Project Draft; R1-2103121, Apr. 7, 2021; https://ftp.3gpp.org/tsg_ran/WG1_RL1/TSGR1_104b-e/Docs/R1-2103121.zip-R1-2103121-Discussion-on-Sidelink-Resource-Allocation-for-Power-Saving.docx (13 pages).

* cited by examiner

METHOD FOR RESOURCE SELECTION, AND APPARATUS, AND USER EQUIPMENT USING THE SAME

CROSS-REFERENCE TO RELATED APPLICATION

The present disclosure claims the priority of Chinese Patent Publication No. 202110506370.2 filed in China on May 10, 2021, the entire content of which is incorporated herein by reference.

FIELD

The present disclosure relates to a field of direct connection communication technology, and in particular, to a method for sidelink resource selection, an apparatus and a user equipment using the same.

BACKGROUND

Typical scenarios where the direct connection communication technology is applicable is Vehicle to Everything (V2X), which supports communication manners such as Vehicle to Vehicle (V2V), Vehicle to Infrastructure (V2I), Vehicle to Pedestrian (V2P), Vehicle to Network (V2N), and so on. Specifically, the aforementioned V2X devices communicate to each other through a sidelink. In addition, the direct connection communication technology is further applicable to other scenarios, such as direct connection communication between smart terminals, and so on.

For the V2X devices, a basic mechanism of resource allocation in related technologies is that a user equipment (UE) learns about resource occupancy situations of other UEs and subsequent resource occupancy situations in real time through contiguous real-time sensing, and when the UE needs resource selection or reselection, it selects appropriate idle resource to send according to the learnt resource occupancy situations. However, for a scenario of direct connection communication with a power-saving requirement, such as Pedestrian to Vehicle (P2V) communication in V2P, or Pedestrian to Pedestrian (P2P) communication of hand-held terminals, it is necessary to redefine a specific process of a resource selection method under the power-saving requirement.

SUMMARY

A purpose of embodiments of the present disclosure is to provide a method for sidelink resource selection, an apparatus and a user equipment using the same, so as to solve a problem that there is no definition of a specific process of a resource selection method under power-saving requirement in the related art.

In a first aspect, an embodiment of the present disclosure provides a method for resource selection, applied to a user equipment, wherein the method including:

in a condition that a service packet is arrived or to be arrived, determining whether resource selection/reselection needs to be triggered.

Optionally, the method further includes: in the condition that the service packet is arrived or to be arrived, determining whether to perform partial sensing; and/or determining a partial sensing occasion.

Optionally, the determining whether to perform partial sensing, includes:

in a condition that it is determined that the resource selection/reselection needs to be triggered for the service packet, determining to perform the partial sensing; and in a condition that it is determined that the resource selection/reselection does not need to be triggered for the service packet, determining whether to perform the partial sensing according to preemption configuration information of a resource pool, or according to the preemption configuration information and a priority of the service packet.

Optionally, the determining whether to perform the partial sensing according to the preemption configuration information of the resource pool or according to the preemption configuration information and the priority of the service packet, includes:

the partial sensing is determined to be performed in any one of conditions of:

the preemption configuration information is enabling;

the preemption configuration information is a threshold of the priority;

the preemption configuration information is enabling and the priority of the service packet is determined to be not a highest priority; and the preemption configuration information is the threshold of the priority and the priority of the service packet is determined to be not the highest priority.

Optionally, the determining whether to perform the partial sensing according to the preemption configuration information of the resource pool, or according to the preemption configuration information and the priority of the service packet, includes:

the partial sensing is determined not to be perform in any one of conditions of:

no preemption configuration information is provided or configured;

the preemption configuration information is disabling;

the preemption configuration information is enabling and the priority of the service packet is determined to be a highest priority; and the preemption configuration information is a threshold of the priority and the priority of the service packet is determined to be the highest priority.

Optionally, the determining the partial sensing occasion, includes:

determining a set of periodicity values corresponding to performing the partial sensing; and determining a resource for performing the partial sensing according to a set of first candidate resources and the set of periodicity values;

wherein the set of first candidate resources includes any one of items of:

predetermined Y time-domain candidate resources; and

Y time-domain candidate resources, after a time of arrival of the service packet and closest to the time of arrival of the service packet, obtained by mapping according to a resource reservation period according to Y time-domain candidate resources determined during resource selection/reselection having been performed.

Optionally, the determining the resource for performing the partial sensing according to the set of first candidate resources and the set of periodicity values, includes:

according to the set of periodicity values, determining that the resource for performing the partial sensing is a resource of a most recent period, corresponding to the set of first candidate resources and before a first time;

wherein the first time is any one of items of:

the time of arrival of the service packet;

a time ty0 at which a first time-domain candidate resource among predetermined at least Y time-domain candidate resources is located; and a time obtained by the time ty0, at which the first time-domain candidate resource among the predetermined at least Y time-domain candidate resources is located, minus a processing delay.

Optionally, the determining the set of periodicity values corresponding to performing the partial sensing, includes:

determining the set of periodicity values, according to a parameter of the periodicity value for determining the partial sensing occasion, wherein the parameter of the periodicity value is preconfigured, or configured by a network; or in a condition that the parameter of the periodicity value for determining the partial sensing occasion, preconfigured, or configured by the network, is not obtained, determining the set of periodicity values according to resource reserve period list information contained in a resource pool configuration parameter.

Optionally, the periodicity values indicated by the parameter of the periodicity value is a subset or all of periodicity values indicated by a resource reserve period list contained in the resource pool configuration parameter.

Optionally, the method further includes:

in a condition that it is determined that the resource selection/reselection needs to be triggered, performing steps of:

determining a first resource selection window at a triggering time of the resource selection; and performing the resource selection within the first resource selection window;

wherein the triggering time of the resource selection is any one of items of:

a time of arrival of the service packet;

a time ty0 at which a first time-domain candidate resource among predetermined at least Y time-domain candidate resources is located; and a time obtained by the time ty0, at which the first time-domain candidate resource among the predetermined at least Y time-domain candidate resources is located, minus a processing delay.

Optionally, a starting time of the first resource selection window is m+T1, and an ending time of the first resource selection window is m+T2; or the starting time of the first resource selection window is n+T1, and the ending time of the first resource selection window is n+T2;

wherein m is the triggering time of the resource selection, n is the time of arrival of the service packet, T1 is a parameter for determining the starting time of the first resource selection window, and T2 is a parameter for determining the ending time of the first resource selection window.

Optionally, in a condition that the triggering time of the resource selection is the time of arrival of the service packet, after the resource selection is performed within the first resource selection window, the method further includes:

determining a check time of the resource selection, and performing resource exclusion based on sensing at the check time of the resource selection; and in a condition that a selected resource is excluded, performing the resource reselection;

wherein the check time of the resource selection is any one of items of:

the time ty0 at which the first time-domain candidate resource among predetermined at least Y time-domain candidate resources is located; and the time obtained by the time ty0, at which the first time-domain candidate resource among the predetermined at least Y time-domain candidate resources is located, minus the processing delay.

Optionally, the method further includes:

performing contiguous partial sensing before the check time of the resource selection.

Optionally, the method further includes:

performing contiguous partial sensing before the triggering time of the resource selection.

Optionally, the method further includes:

in a condition that it is determined that the resource selection/reselection needs to be triggered, performing steps of:

determining a second resource selection window; and performing the resource selection within the second resource selection window.

Optionally, a starting time of the second resource selection window is p+T1, and an ending time of the second resource selection window is p+T2;

wherein p is a reference time of the second resource selection window, T1 is a parameter for determining the starting time of the second resource selection window, and T2 is a parameter for determining the ending time of the second resource selection window;

wherein the reference time of the second resource selection window is any one of items of:

a time of arrival of the service packet;

a time ty0 at which a first time-domain candidate resource among predetermined at least Y time-domain candidate resources is located; and a time obtained by the time ty0, at which the first time-domain candidate resource among the predetermined at least Y time-domain candidate resources is located, minus a processing delay.

Optionally, the method further includes:

in a condition that it is determined to perform the partial sensing, after a second time, contiguously perform resource sensing till re-evaluation checking and/or preemption checking is/are completed;

wherein the second time is any one of items of:

a time of arrival of the service packet;

a time ty0 at which a first time-domain candidate resource among predetermined at least Y time-domain candidate resources is located; and a time obtained by the time ty0, at which the first time-domain candidate resource among the predetermined at least Y time-domain candidate resources is located, minus a processing delay.

In a second aspect, an embodiment of the present disclosure further provides a user equipment, including: a transceiver, a storage, a processor, and a computer program stored on the storage and capable of running on the processor, wherein, when the processor executes the computer program, the processor implements the method for resource selection as described in the first aspect.

In a third aspect, an embodiment of the present disclosure further provides an apparatus for resource selection, applied to the user equipment, including:

a first determining module, configured to determine whether resource selection/reselection needs to be triggered in a condition that a service packet is arrived or to be arrived.

In a fourth aspect, an embodiment of the present disclosure further provides a computer-readable storage medium, on which a computer program is stored, wherein, when the computer program is executed by a processor, the processor implements the method for resource selection as described in the first aspect.

The above-mentioned technical solutions of the present disclosure have at least beneficial effects as below:

In the resource selection method of the embodiments of the present disclosure, in the condition that the service packet is arrived or to be arrived, it is determined whether the resource selection/reselection needs to be triggered, which solves the problem that at present there is no definition of the specific process of the resource selection method under the power-saving requirement, realizes clarification of a determination process of triggering the resource selection/reselection in the condition that the service packet of the resource is arrived or the service packet is to be arrived under the power-saving mechanism in a process of resource allocation, and realizes standardization of the process of resource allocation.

DETAILED DESCRIPTION OF THE EMBODIMENTS

Figure 1:
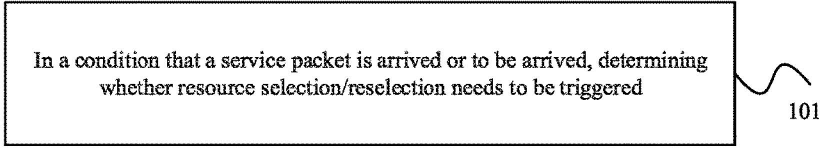
FIG. 1 is a schematic flowchart of a resource selection method in an embodiment of the present disclosure.

In order to make technical problems, technical solutions and advantages to be solved by the present disclosure clearer, followings will describe in detail with reference to accompanying drawings and specific embodiments. In the following description, specific details such as specific configurations and components are provided only to help a comprehensive understanding of the embodiments of the present disclosure. Accordingly, those of ordinary skill in the art should recognize that various changes and modifications of the embodiments described herein may be made without departing from the scope and spirit of the disclosure. Further, descriptions of well-known functions and constructions are omitted for clarity and conciseness.

It should be understood that reference throughout the specification to “one embodiment” or “an embodiment” means that a particular feature, structure or characteristic related to the embodiment is contained in at least one embodiment of the present disclosure. Thus, appearances of “in one embodiment” or “in an embodiment” in various places throughout the specification are not necessarily referring to the same embodiment. Furthermore, the particular features, structures or characteristics may be combined in any suitable manner in one or more embodiments.

In various embodiments of the present disclosure, it should be understood that sequence numbers of following processes do not mean an order of performing, and a performing order of each process should be determined by its functions and internal logic, which should not constitute any limitation in implementation of the embodiments of the present disclosure.

In the embodiments provided in the present disclosure, it should be understood that “B corresponding to A” means that B is associated with A, and B may be determined according to A. However, it should further be understood that determining B according to A does not mean determining B only according to A, and B may be determined according to A and/or other information.

Before proceeding to the description of the embodiments of the present disclosure, the content related to the embodiments of the present disclosure will be described first:

LTE-V2X supports a partial sensing mechanism based on periodic service transmission. When a service packet is arrived (denoted as time n), a UE determines a resource selection window [n+T1, n+T2] containing at least Y subframes, wherein determination of T1 and T2 depends on implementation of the UE, but it needs to meet T1≤4, 20≤T2≤100 and the determination of T2 needs to meet a transmission delay requirement, and Y needs to be greater than or equal to a high-level parameter MinNumCandidateSF. At the same time, for the Y subframes contained in the resource selection window, as candidate resources (each marked as $$t_y^{SL}$$

sensing results thereof are obtained according to a high-level signaling gapCandidateSensing. If a k-th bit of the gapCandidateSensing is 1, the UE needs to monitor a $$t_{y-k\times P_{step}}^{SL}$$

subframe, and obtains the sensing result thereof. Values of $P_{step}$ in dedicated frequency bands in different Time Division Duplexing (TDD) configurations or Intelligent Traffic Systems (ITS), are shown in Table 1 below.

TABLE 1

| | $P_{step}$ |
|---|---|
| TDD with UL/DL configuration 0 | 60 |
| TDD with UL/DL configuration 1 | 40 |

TABLE 1-continued

| | $P_{step}$ |
|---|---|
| TDD with UL/DL configuration 2 | 20 |
| TDD with UL/DL configuration 3 | 30 |
| TDD with UL/DL configuration 4 | 20 |
| TDD with UL/DL configuration 5 | 10 |
| TDD with UL/DL configuration 6 | 50 |
| Otherwise | 100 |

NR-V2X version 16 (Release 16) determines a full sensing resource selection mechanism. A sensing window may be a logical slot within 1100 ms or 100 ms according to a configuration of a resource pool. The resource selection window is [n+T1, n+T2], and the determination of T1 and T2 depends on the implementation of the UE and needs to meet following conditions:

(1)

$$0 \le T1 \le T_{proc,1}^{SL},$$

wherein a value of $$T_{proc,1}^{SL}$$

is related to a SCS (sub-carrier space) configuration parameter $\mu_{SL}$, which is:

TABLE 2

| $\mu_{SL}$ | $T_{proc,1}^{SL}$ [slot] |
|---|---|
| 0 | 3 |
| 1 | 5 |
| 2 | 9 |
| 3 | 17 |

(2) For T2min determined according to a high-level parameter sl-SelectionWindowList, if T2min is less than a remaining delay budget of a service packet, T2min≤T2≤the remaining delay budget of the service packet (slot granularity representation); otherwise T2 is determined as the remaining delay budget of the service packet (slot granularity representation).

However, there is currently no solution to solve a problem of decrease in reliability, generated by absence of necessary sensing results, caused by a large time interval between the time n of arrival of the service packet and a first candidate time-domain resource ty0, due to determining Y candidate time-domain resources for DRX ON Duration and the implementation of the UE.

In following, the resource selection method of the embodiments of the present disclosure will be described with reference to the accompanying drawings.

As shown in FIG. 1, an embodiment of the present disclosure provides a resource selection method, which is applied to a user equipment, and the resource selection method includes:

Step 101, in a condition that a service packet is arrived or to be arrived, determining whether resource selection/reselection needs to be triggered.

Here, it should be noted that, first, a resource selection manner of the user equipment is based on the partial sensing, specifically, the user equipment may determine to perform the resource selection of the partial sensing by itself, or be (pre)configured to perform the resource selection based on the partial sensing, or determine to perform the resource selection based on the partial sensing in response to that a trigger condition of the partial sensing is met. Second, the service packet is a periodic service packet, and the UE may predict the time of arrival of the service packet in advance. For example, when the service packet is arrived, the UE may predict a next service packet will be arrived at a time later than the current time of arrival by one period. Therefore, the above step may be performed at the time of arrival of the service packet or when the service packet is to be arrived, and a specific time for performing the above step may be determined by the UE itself. For example, it may be performed at the time of arrival of the periodic service packet, or it may be performed at the time of arrival of the previous periodic service packet, or it may be determined to be performed by the UE itself at a time after the previous periodic service packet is arrived, or it may be performed after the previous periodic service packet is arrived and transmission thereof is completed, or it may be performed at a first time before the time of arrival of the previous periodic service packet, wherein an interval between the first time and the time of arrival of the periodic service packet may be a preset duration. Third, the resource selection method in the embodiments of the present disclosure is applicable to the field of direct connection communication technology, wherein a typical application scenario of the direct connection communication technology is a direct connection communication scenario of the Internet of Vehicles, and of course, other direct connection communication scenarios may be included. It should be noted that description of arrival of the service packet is expressed in a specific level, which is equivalent to expressions such as "sidelink data is available", "a Media Access Control Protocol Data Unit (MAC PDU) is available", "a transmission block is available", and so on; and description of "the service packet is to be arrived" is equivalent to expressions such as "predicted sidelink data will be available", "a predicted MAC PDU will be available", "a predicted transmission block will be available", "the predicted sidelink data will be available after a period after current sidelink data is available", "the predicted MAC PDU will be available after a period after a current MAC DPU is available", "the predicted transmission block will be available after a period after a current transmission block is available", and so on.

In the resource selection method of the embodiments of the present disclosure, in the condition that the service packet is arrived or to be arrived, the user equipment determines whether the resource selection/reselection needs to be triggered, which solves the problem that at present there is no definition of the specific process of the resource selection method under the power-saving requirement, realizes clarification of the determination process of triggering the resource selection/reselection in the condition that the service packet of the resource is arrived or the service packet is to be arrived under the power-saving mechanism in the process of resource allocation, and realizes the standardization of the process of resource allocation.

Here, it should be noted that, among V2X devices, for the V2X device for which pedestrians cannot ensure continuous and sufficient power supply, such as Pedestrian User Equipment (P-UE), known as a Vulnerable Road User (VRU) as well, or in a condition that energy saving is required, for example, endurance of a vehicle is insufficient or roadside equipment does not have to continue to work when a number of vehicles is small, the power-saving mechanism of the UE needs to be considered.

For the resource selection under the power-saving mechanism, 3GPP (3rd Generation Partnership Project) Release 14 defines the partial sensing mechanism for the periodic service transmission. At time n when the periodic service packet is arrived, the UE determines Y subframes (each marked as $$t_y^{SL}$$

of no less than gapCandidateSensing candidate resources according to the resource selection window. Since the UE may predict the time of arrival of the service packet in advance, the UE has already performed the partial sensing, monitored the $$t_{y-k\times P_{step}}^{SL}$$

subframe, and acquired the sensing result according to the high-level parameter MinNumCandidateSF and gapCandidateSensing at time n; and k is determined according to the high-level signaling gapCandidateSensing, corresponding to a case that the k-th bit of gapCandidateSensing is 1.

Figure 2:
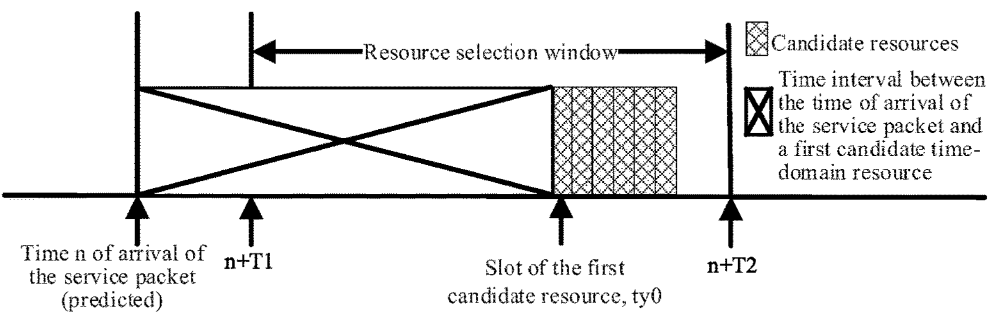
FIG. 2 is a schematic diagram of a relationship between a time of arrival of a service packet and a position of a first candidate resource in the related art.

In New Radio-Vehicle to Everything (NR-V2X), the power-saving mechanism needs to further consider Discontinuous Reception (DRX). For a case that a sending UE performs the resource selection and needs to align DRX ON of a receiving UE, in combination with that determination of Y time-domain resources depends on the implementation of the UE, the UE may determine Y candidate time-domain resources at a back position in the resource selection window. If only the partial sensing mechanism of the Long Term Evolution-Vehicle to Everything (LTE-V2X) is referred to, the time interval between the time n and the first candidate time-domain resource ty0 after the time n may be relatively large, as shown in FIG. 2, and absence of this part of the sensing result will lead to decrease in transmission reliability.

However, in another aspect, if sensing is contiguously to be performed after the time n, and when a delay requirement is not high, that is, when the service packet is arrived, a Packet Delay Budget (PDB) is large, such as 250 ms, and further in combination with a condition of alignment of the DRX ON duration, the UE will contiguously perform the sensing for a relatively long time after the time n, for example, it may reach 200 ms, and power consumption will be significantly increased at this time.

Therefore, as an optional implementation, the method further includes:

in the condition that the service packet is arrived or to be arrived, determining whether to perform the partial sensing; and/or determining a partial sensing occasion.

In the optional implementation, in the condition that the service packet is arrived or to be arrived, through determining whether to perform the partial sensing on the service packet, it is realized to determine to perform the partial sensing on each arrived service packet among the periodic service packets, or perform the partial sensing on only a part of the service packets among the periodic service packets. Compared to the partial sensing occasion at present being the time of arrival of the service packet, the embodiments of the present disclosure may further sense resources between the time of arrival of the service packet and the first candidate time-domain resource, through determining the partial sensing occasion, which reduces a problem of reliability degradation of data transmission caused by absence of necessary sensing results.

As an optional implementation, determine whether to perform the partial sensing, includes:

in a condition that it is determined that the resource selection/reselection needs to be triggered for the service packet, determining to perform the partial sensing; and in a condition that it is determined that the resource selection/reselection does not need to be triggered for the service packet, determining whether to perform the partial sensing according to preemption configuration information of the resource pool, or according to the preemption configuration information and a priority of the service packet.

Here, it should be noted that, in the optional implementation, whether to trigger the resource selection/reselection for the service packet may be determined according to provisions of section 5.22.1.2 of 3GPP TS 38.321. Among them, in a condition that it is determined that the resource selection needs to be triggered for the service packet according to the provisions of section 5.22.1.2 of 3GPP TS 38.321, the partial sensing needs to be performed; and in a condition that it is determined that the resource selection does not need to be triggered for the service packet according to the provisions of section 5.22.1.2 of 3GPP TS 38.321, whether to perform the partial sensing is further determined according to the preemption configuration information of the resource pool, or according to the preemption configuration information and the priority of the service packet.

It should be noted that the partial sensing mechanism in related technology does not involve processing related to re-evaluation or preemption, so there is no technical problem of determining whether to perform the partial sensing when the service packet is arrived but it does not need to trigger the resource selection/reselection. Therefore, in the optional implementation, it is determined whether to perform the partial sensing in combination with the preemption configuration information, which realizes maximum energy saving of the UE and meets requirements of the power-saving mechanism of the UE.

As a specific implementation, determining whether to perform the partial sensing according to the preemption configuration information of the resource pool or according to the preemption configuration information and the priority of the service packet, includes:

the partial sensing is determined to be performed in any one of following conditions:

the preemption configuration information is enabling;

the preemption configuration information is a threshold of the priority;

the preemption configuration information is enabling and the priority of the service packet is determined to be not a highest priority; and the preemption configuration information is the threshold of the priority and the priority of the service packet is determined to be not the highest priority.

Here, it should be noted that, in determining whether to perform the partial sensing in the condition that the service packet is to be arrived, the priority of the service packet to be arrived may be determined according to a priority of the service packet arrived last time, which is adjacent to the service packet to be arrived this time, among the periodic service packets.

That is to say, in the specific implementation, in a condition that the UE determines that the preemption configuration information of the resource pool is enabling, the UE determines that it needs to perform the partial sensing; or in a condition that the UE determines that the preemption configuration information of the resource pool is the threshold of the priority, the UE determines that it needs to perform the partial sensing; or in a condition that the UE determines that the preemption configuration information of the resource pool is enabling and further determines that the priority of the service packet is not the highest priority, the UE determines that it needs to perform the partial sensing; or in a condition that the UE determines that the preemption configuration information of the resource pool is the threshold of the priority and further determines that the priority of the service packet is not the highest priority, the UE determines that it needs to perform the partial sensing.

Here, it should be noted that, if the UE determines not to perform the resource selection/reselection on the current service packet, but only performs preemption check on the current service packet, a process of the check at this time may adopt a process in the method adopted by the present disclosure, except a step of the resource selection in determining to perform the resource selection/reselection on the service packet.

Figure 4:
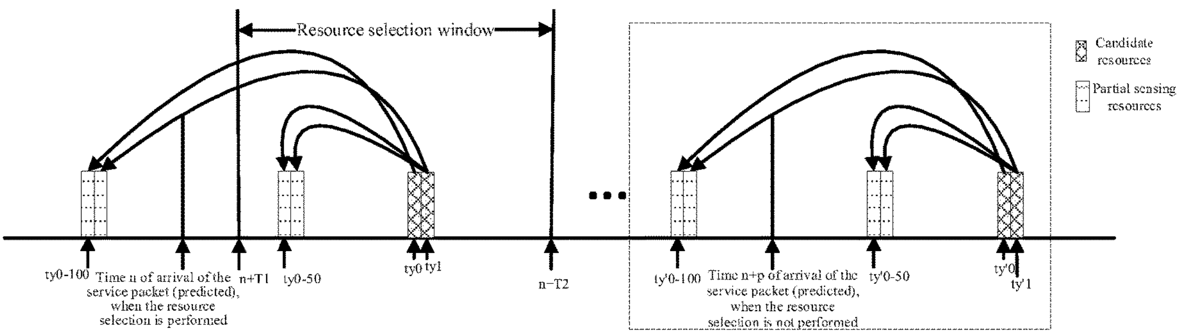
FIG. 4 is a second schematic diagram of performing the partial sensing in an embodiment of the present disclosure.

Specifically, as shown in FIG. 4, it is a second schematic diagram of performing the partial sensing in an embodiment of the present disclosure, wherein FIG. 4 is a schematic diagram of performing the partial sensing, in the condition that the preemption configuration information is enabling or the threshold of the priority (a specific value of the priority) and the priority of the service packet sent by the UE is not the highest priority. Specifically, a dotted box in FIG. 4 shows that the partial sensing is performed, in a condition that no resource reselection is performed on the service packets predicted to be arrived at time n+p, the preemption configuration information is enabling or the specific value of the priority, and the service packet sent by the UE is not the highest priority.

As another specific implementation, determining whether to perform the partial sensing according to the preemption configuration information of the resource pool, or according to the preemption configuration information and the priority of the service packet, includes:

the partial sensing is determined not to be perform in any one of following conditions:

no preemption configuration information is provided or configured, that is, sl-PreemptionEnable-r16 is not configured or not provided;

the preemption configuration information is disabling;

the preemption configuration information is enabling and the priority of the service packet is determined to be the highest priority; and the preemption configuration information is the threshold of the priority and the priority of the service packet is determined to be the highest priority.

Similarly, in determining whether to perform the partial sensing in the condition that the service packet is to be arrived, the priority of the service packet to be arrived may be determined according to the priority of the service packet arrived last time, which is adjacent to the service packet to be arrived this time.

Figure 3:
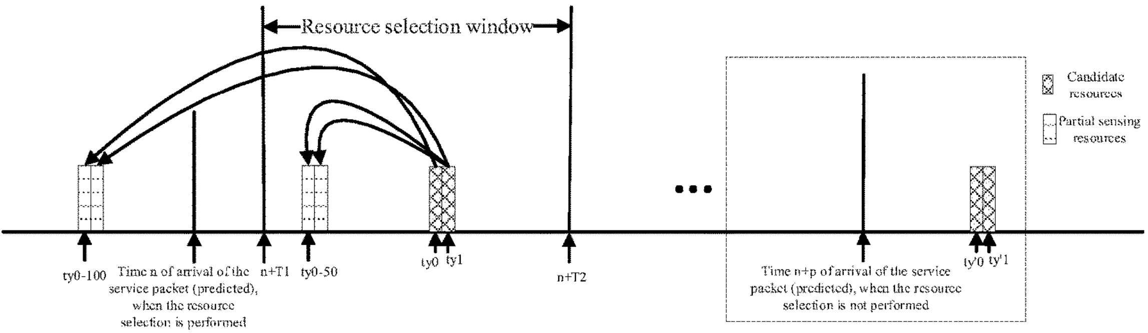
FIG. 3 is a first schematic diagram of performing the partial sensing in an embodiment of the present disclosure.

Specifically, as shown in FIG. 3, it is a first schematic diagram of performing the partial sensing in an embodiment of the present disclosure, wherein FIG. 3 is a schematic diagram of performing no partial sensing, in the condition that no preemption configuration information is provided or configured and the service packet sent by the UE is the highest. Specifically, a dotted box in FIG. 3 shows that no partial sensing is performed, in a condition that no resource reselection is performed on the service packets predicted to be arrived at time n+p, no preemption configuration information is provided or configured, or the service packet sent by the UE is the highest.

The above optional implementation and the two specific implementations realize that, when sending of the periodic service packet is determined in combination with the preemption configuration information, the partial sensing is performed on each arrived service packet or the partial sensing is performed on only a part of the service packets, which realizes maximum power-saving of the UE.

As an optional implementation, determining the partial sensing occasion, includes:

determining a set of periodicity values corresponding to performing the partial sensing; and determining a resource for performing the partial sensing according to a set of first candidate resources and the set of periodicity values;

wherein the set of first candidate resources includes any one of following items:

predetermined Y time-domain candidate resources; and

Y time-domain candidate resources, after the time of arrival of the service packet and closest to the time of arrival of the service packet, obtained by mapping according to a resource reservation period according to Y time-domain candidate resources determined during resource selection/reselection having been performed.

That is to say, the Y time-domain candidate resources may be time-domain candidate resources determined in advance, or may be resources mapped according to Y time-domain candidate resources determined during the resource selection/reselection having been performed.

In the optional implementation, the UE uses the predetermined Y time-domain candidate resources for the resource selection/reselection to be performed, or the UE makes the Y time-domain candidate resources determined during the resource selection/reselection last time correspond to a time-domain position after the service packet to be arrived. For the above time-domain resources, the UE determines the resource for performing the partial sensing according to the set of periodicity values corresponding to that a periodic partial sensing needs to be performed. Thus, sensing of resources between the time of arrival of the service packet and a time of the first candidate time-domain resource may be realized, which avoids a case of the reliability degradation of data transmission caused by the absence of sensing results, and ensures reliability of data transmission under the power-saving mechanism.

Here, it should be noted that the determined resource for performing the partial sensing may be one or more periods of resources, determined according to a sl-ResourceReservePeriodList-r16 parameter and located before the Y time-domain candidate resources, among for periodic partial sensing resources.

As a specific implementation, determining the resource for performing the partial sensing according to the set of first candidate resources and the set of periodicity values, includes:

according to the set of periodicity values, determining that the resource for performing the partial sensing is a resource of a most recent period, corresponding to the set of first candidate resources and before a first time;

wherein the first time is any one of following items:

the time of arrival of the service packet;

a time ty0 at which a first time-domain candidate resource among predetermined at least Y time-domain candidate resources is located; and a time obtained by the time ty0, at which the first time-domain candidate resource among the predetermined at least Y time-domain candidate resources is located, minus a processing delay.

Here, it should be noted that ty0 may be represented by a basic time unit supported by a system, such as a physical slot or a logical slot in NR-V2X Release 16, or a slot in the resource pool.

Here, it should be further noted that the processing delay may be determined by at least one of a processing time Tproc,0 of the sensing result, a selection and sending time Tproc,1 of the resource, and a parameter T1 for determining the starting time of the resource selection window. Specifically, the processing delay may be any one of following items:

$$Tproc,1;$$

$$T1;$$

$$Tproc,0+Tproc,1;$$

$$Tproc,0+T1;$$

$$Tproc,1+1;$$

$$T1+1;$$

$$(Tproc,0+Tproc,1)+1;\text{ and}$$

$$(Tproc,0+T1)+1;$$

wherein the "1" in the above formulae represents a time unit, therefore, the processing delay may be the time unit as well, and the time unit may be an Orthogonal Frequency Division Multiplexing (OFDM) symbol, a physical slot, a logical slot, a slot in the resource pool, a physical subframe, a logical subframe, or a subframe in the resource pool, or a millisecond (ms), etc.; and units of the parameters such as Tproc,0, Tproc,1, and T1 in the above formulae are all time units defined by a sidelink, for example, the unit may be the OFDM symbol, the physical slot, the logical slot, the slot in the resource pool, the physical subframe, the logical subframe, or the subframe in the resource pool, or the millisecond (ms), etc.

Therefore, the first time may be any one of: the time of arrival of the service packet, ty0, ty0-Tproc,1, ty0-T1, ty0-(Tproc,0+Tproc,1), ty0-(Tproc,0+T1), ty0−1, ty0-Tproc,1−1, ty0-T1−1, ty0-(Tproc,0+Tproc,1)−1, and ty0-(Tproc,0+T1)−1, wherein the parameters may be other parameter names with different names but having a same value, for example, when the processing delay corresponds to the above T1, T1 may be equivalently expressed as T4 and T4=T1.

In the optional implementation, by determining that the resource for performing the partial sensing is the resource of the most recent period, corresponding to the set of first candidate resources and before the first time, the sensing of the resources between the time of arrival of the service packet and the time of the first candidate time-domain resource may be realized, which avoids a phenomenon of the reliability degradation of data transmission caused by the absence of sensing results.

As an optional implementation, determining the set of periodicity values corresponding to that the periodic partial sensing needs to be performed, includes:

determining the set of periodicity values, according to a parameter of the periodicity value for determining the partial sensing occasion, wherein the parameter of the periodicity value is preconfigured, or configured by a network.

Figure 6:
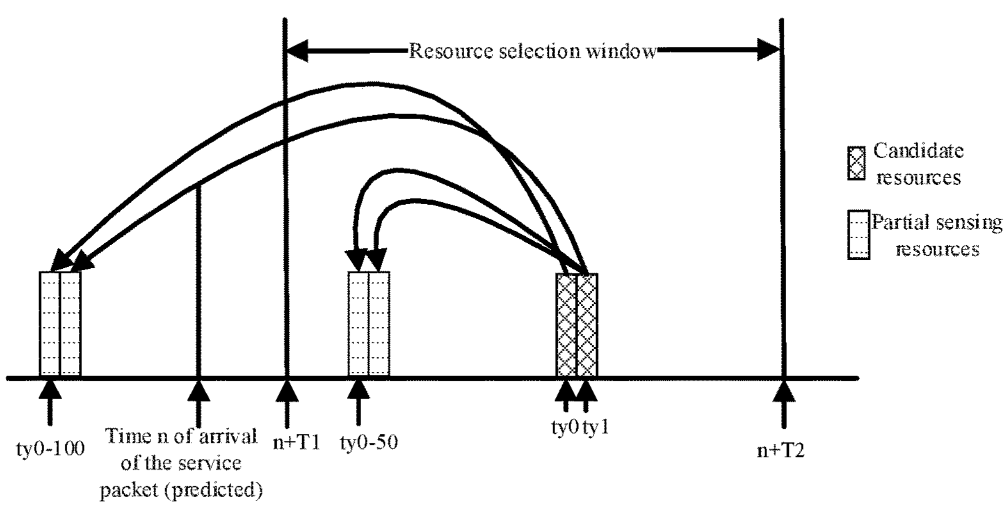
FIG. 6 is a schematic diagram of performing the partial sensing when parameters of the periodicity value is obtained in an embodiment of the present disclosure.

FIG. 6 shows the resource for performing the partial sensing (only the resource of the most recent period, corresponding to the set of first candidate resources, is shown), determined according to the set of periodicity values obtained in a condition that resource reserve period list information sl-ResourceReservePeriodList-r16={13, 50, 100} and a obtained parameter of the periodicity value (a parameter indicating Preserve)={50, 100}.

Alternatively, in a condition that the parameter of the periodicity value for determining the partial sensing occasion, preconfigured, or configured by the network, is not obtained, the set of periodicity values is determined according to the resource reserve period list information contained in a resource pool configuration parameter. In this way, the determining of the partial sensing occasion may be realized without introducing a new period configuration signaling dedicated to the partial sensing.

Figure 5:
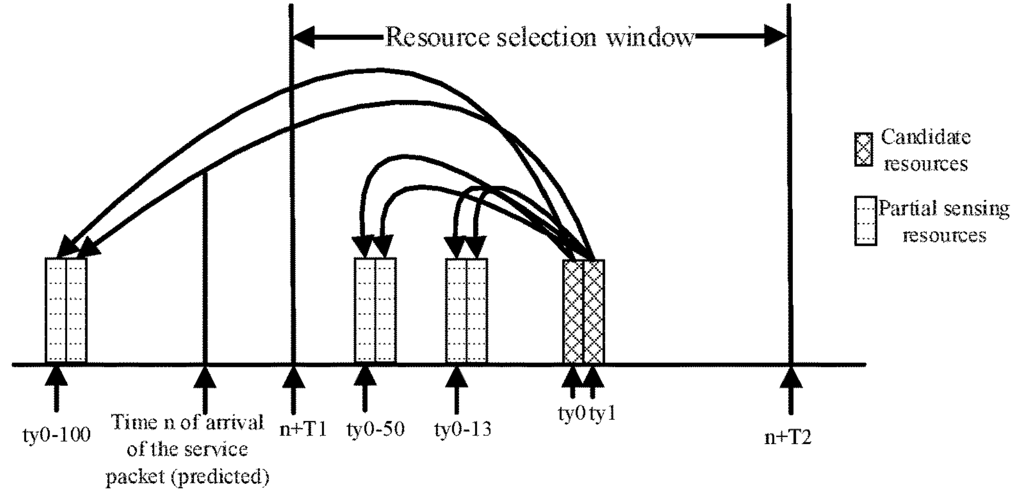
FIG. 5 is a schematic diagram of performing the partial sensing when no parameter of periodicity value is obtained in an embodiment of the present disclosure.

FIG. 5 shows the resource for performing the partial sensing (only the resource of the most recent period, corresponding to the set of first candidate resources, is shown), determined according to the set of periodicity values obtained in a condition that the resource reserve period list information sl-ResourceReservePeriodList-r16={13, 50, 100} and the parameter of the periodicity value (the parameter indicating Preserve) is not obtained.

In the optional implementation, when the UE determines a specific partial sensing occasion, if a dedicated signaling for the partial sensing is configured, the dedicated signaling is adopted to determine the set of periodicity values; and if no dedicated signaling is configured for the partial sensing, it is performed according to the periodicity values in a resource pool configuration signaling.

As an optional implementation, the periodicity values indicated by the parameter of the periodicity value is a subset or all of periodicity values indicated by a resource reserve period list contained in the resource pool configuration parameter.

That is to say, in the embodiments of the present disclosure, the resources for performing the partial sensing may be the same as the resources for the periodic partial sensing supported by the resource pool, or be a subset of the resources for the periodic partial sensing supported by the resource pool.

The resource selection method in the embodiments of the present disclosure, by determining the partial sensing occasion according to the first time when performing the partial sensing, realizes the sensing of the resources between the time of arrival of the service packet and the time at which the first candidate time-domain resource is located, which avoids the phenomenon of the reliability degradation of data transmission caused by the absence of necessary sensing results, and ensures the reliability of transmission.

As an optional implementation, the method further includes:

Step 1: determining a first resource selection window at a triggering time of the resource selection; and Step 2: performing the resource selection within the first resource selection window;

wherein the triggering time of the resource selection is any one of following items:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Here, it should be noted that ty0 may be represented by the basic time unit supported by the system, such as the physical slot or the logical slot in NR-V2X Release 16, or the slot in the resource pool.

Here, it should be further noted that the processing delay may be determined by at least one of the processing time Tproc,0 of the sensing result, the selection and sending time Tproc,1 of the resource, and the parameter T1 for determining the starting time of the first resource selection window. Specifically, the processing delay may be any one of following items: Tproc,1; T1; Tproc,0+Tproc,1; Tproc,0+T1; Tproc,1+1; T1+1; (Tproc,0+Tproc,1)+1; and (Tproc,0+T1)+1; wherein the "1" in the above formulae represents the time unit, therefore, the processing delay may be the time unit as well, and the time unit may be the OFDM symbol, the physical slot, the logical slot, the slot in the resource pool, the physical subframe, the logical subframe, or the subframe in the resource pool, or the ms, etc.

The units of the parameters such as Tproc,0, Tproc,1, and T1 in the above formulae are all the time units defined by the sidelink, for example, the unit may be the OFDM symbol, the physical slot, the logical slot, the slot in the resource pool, the physical subframe, the logical subframe, or the subframe in the resource pool, or the ms, etc.

Therefore, the triggering time of the resource selection may be any one of: the time of arrival of the service packet, ty0, ty0-Tproc,1, ty0-T1, ty0-(Tproc,0+Tproc,1), ty0-(Tproc,0+T1), ty0−1, ty0-Tproc,1−1, ty0-T1−1, ty0-(Tproc,0+Tproc,1)−1, and ty0-(Tproc,0+T1)−1, wherein the parameters may be other parameter names with different names but having the same value, for example, when the processing delay corresponds to the above T1, T1 may be equivalently expressed as T4 and T4=T1.

As a specific implementation, a starting time of the first resource selection window is m+T1, and an ending time of the first resource selection window is m+T2; or the starting time of the first resource selection window is n+T1, and the ending time of the first resource selection window is n+T2; wherein m is the triggering time of the resource selection, n is the time of arrival of the service packet, T1 is a parameter for determining the starting time of the first resource selection window, and T2 is a parameter for determining the ending time of the first resource selection window.

Here, it should be noted that, in a condition that the triggering time of the resource selection is the time of arrival of the service packet, it is determined that the starting time of the first resource selection window is n+T1, and the ending time of the first resource selection window is n+T2. In a condition that the triggering time of the resource selection is not the time of arrival of the service packet, it is determined that the starting time of the first resource selection window is m+T1, and the ending time of the first resource selection window is m+T2; or the starting time of the first resource selection window is n+T1, and the ending time of the first resource selection window is n+T2.

Figure 7:
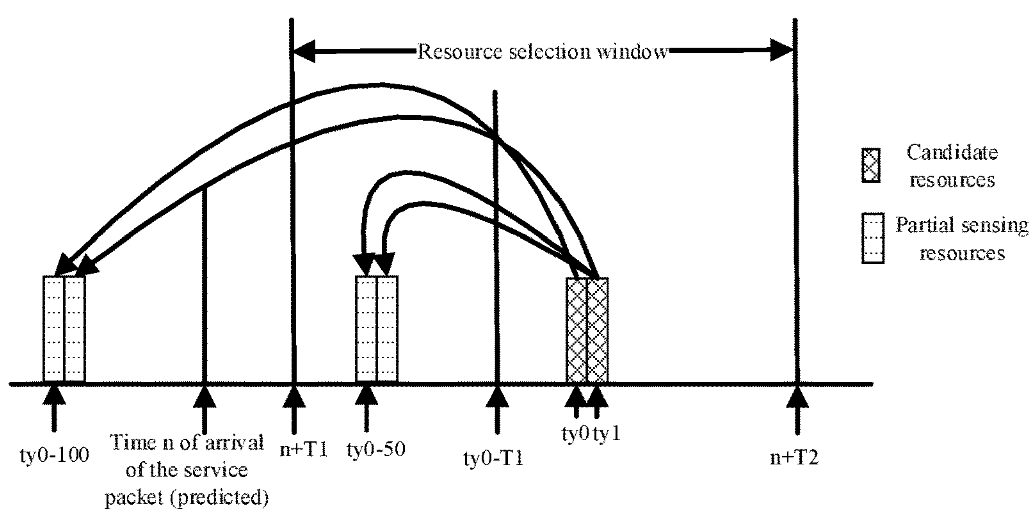
FIG. 7 is a schematic diagram of performing resource exclusion at a check time of resource selection in an embodiment of the present disclosure.

Further, as shown in FIG. 7, as an optional implementation, in the condition that the triggering time of the resource selection is the time of arrival of the service packet, after the resource selection is performed within the first resource selection window, the method further includes:

determining a check time of the resource selection (such as the time ty0-T1 in FIG. 7), and performing resource exclusion based on the sensing at the check time of the resource selection; and in a condition that a selected resource is excluded, performing the resource reselection;

wherein the check time of the resource selection is any one of following items:

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Here, it should be further noted that the processing delay may be determined by at least one of the processing time Tproc,0 of the sensing result, the selection and sending time Tproc,1 of the resource, and the parameter T1 for determining the starting time of the first resource selection window. Specifically, the processing delay may be any one of following items: Tproc,1; T1; Tproc,0+Tproc,1; Tproc,0+T1; Tproc,1+1; T1+1; (Tproc,0+Tproc,1)+1; and (Tproc,0+T1)+1; wherein the "1" in the above formulae represents the time unit, therefore, the processing delay may be the time unit as well, and the time unit may be the OFDM symbol, the physical slot, the logical slot, the slot in the resource pool, the physical subframe, the logical subframe, or the subframe in the resource pool, or the ms, etc.

The units of the parameters such as Tproc,0, Tproc,1, and T1 in the above formulae are all the time units defined by the sidelink, for example, the unit may be the OFDM symbol, the physical slot, the logical slot, the slot in the resource pool, the physical subframe, the logical subframe, or the subframe in the resource pool, or the ms, etc.

In addition, it should be noted that a reason for determining the check time of the resource selection and checking the selected resource at the check time of the resource selection is that: although when the partial sensing is defined, the partial sensing occasion may be determined based on the time ty0 at which the first time-domain candidate resource among the predetermined at least Y time-domain candidate resources is located, or the time obtained by the time ty0, at which the first time-domain candidate resource among the predetermined at least Y time-domain candidate resources is located, minus the processing delay, but if the triggering time of the resource selection is determined as the time of arrival of the service packet, it may not ensure that all sensing results of the partial sensing are fully used to avoid collisions. Therefore, it is necessary to additionally define the check time of the resource selection for this specific implementation, so as to ensure that all the sensing results of the partial sensing may be fully used.

Therefore, the triggering time of the resource selection may be any one of: ty0, ty0-Tproc,1, ty0-T1, ty0-(Tproc,0+Tproc,1), ty0-(Tproc,0+T1), ty0−1, ty0-Tproc,1−1, ty0-T1−1, ty0-(Tproc,0+Tproc,1)−1, and ty0-(Tproc,0+T1)−1, wherein the parameters may be other parameter names with different names but having the same value, for example, when the processing delay corresponds to the above T1, T1 may be equivalently expressed as T4 and T4=T1.

Specifically, in the embodiments of the present disclosure, determining the check time of the resource selection, and performing the resource exclusion based on the sensing at the check time of the resource selection, includes:

a physical layer of the user equipment determines the check time of the resource selection, and performs the resource exclusion based on the sensing at the check time of the resource selection; and a MAC layer of the user equipment determines the check time of the resource selection, and triggers the physical layer of the user equipment to perform the resource exclusion based on the sensing at the check time of the resource selection.

That is to say, in the embodiments of the present disclosure, the check time of the resource selection may be determined by the physical layer, or the check time of the resource selection may be determined by the MAC layer as well; in a condition that the check time of the resource selection is determined by the physical layer, the physical layer may perform the resource exclusion based on the sensing at the check time of the resource selection; and in a condition that the check time of the resource selection is determined by the MAC layer, the MAC layer triggers the physical layer of the user equipment to perform the resource exclusion based on the sensing at the check time of the resource selection. In this way, it avoids a plurality of interactions between the physical layer and the MAC layer, and realizes balance of power saving and the reliability of the UE.

Further, after the physical layer performs the resource exclusion based on the sensing at the check time of the resource selection, the physical layer reports an exclusion result to the MAC layer; the MAC layer determines whether the selected resource is excluded according to the exclusion result; and in a condition that the MAC layer determines the selected resource has been excluded, it performs the resource reselection.

Figure 8:
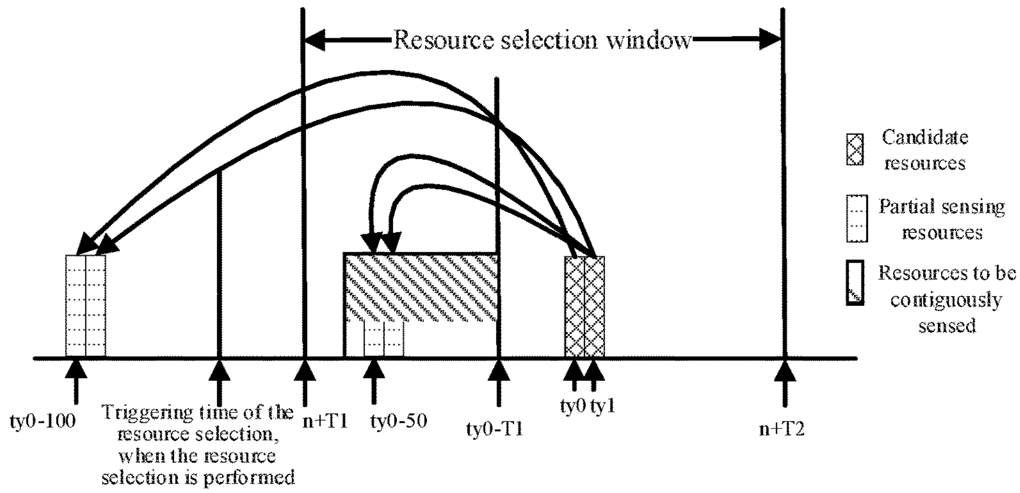
FIG. 8 is a first schematic diagram of performing contiguous partial sensing before the check time of the resource selection in an embodiment of the present disclosure.
Figure 9:
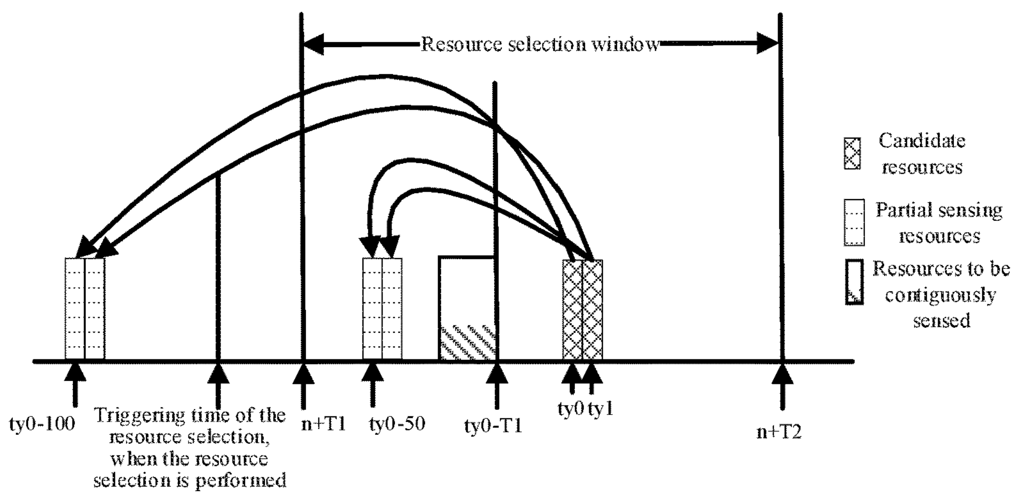
FIG. 9 is a second schematic diagram of performing the contiguous partial sensing before the check time of the resource selection in an embodiment of the present disclosure.

As an optional implementation, as shown in FIG. 8 and FIG. 9, the method further includes: performing contiguous partial sensing before the check time of the resource selection. In the optional implementation, by performing the contiguous partial sensing before the check time of the resource selection, the phenomenon of the reliability degradation of data transmission caused by the absence of necessary sensing results is avoided, and the transmission reliability under the power-saving mechanism is ensured.

Specifically, in the optional implementation, performing the contiguous partial sensing before the check time of the resource selection in the condition that the check time of the resource selection is determined by the MAC layer of the user equipment, includes: the MAC layer of the user equipment triggers the physical layer of the user equipment to perform contiguous sensing before the check time of the resource selection; or performing the contiguous partial sensing before the check time of the resource selection in the condition that the check time of the resource selection is determined by the physical layer of the user equipment, includes: the physical layer performs contiguous sensing before the check time of the resource selection.

As an optional implementation, the method further includes:

before the triggering time of the resource selection, the contiguous partial sensing is performed. In this way, the phenomenon of the reliability degradation of data transmission caused by the absence of necessary sensing results is avoided, and the transmission reliability under the power-saving mechanism is ensured.

As an optional implementation, the method further includes:

in the condition that it is determined that the resource selection/reselection needs to be triggered, performing following steps:

determining a second resource selection window; and performing the resource selection within the second resource selection window.

Specifically, the starting time of the second resource selection window is p+T1, and the ending time of the second resource selection window is p+T2;

wherein p is a reference time of the second resource selection window, T1 is the parameter for determining the starting time of the second resource selection window, and T2 is the parameter for determining the ending time of the second resource selection window;

wherein the reference time of the second resource selection window is any one of following items:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Here, it should be further noted that the processing delay may be determined by at least one of the processing time Tproc,0 of the sensing result, the selection and sending time Tproc,1 of the resource, and the parameter T1 for determining the starting time of the second resource selection window. Specifically, the processing delay may be any one of following items: Tproc,1; T1; Tproc,0+Tproc,1; Tproc,0+T1; Tproc,1+1; T1+1; (Tproc,0+Tproc,1)+1; and (Tproc,0+T1)+1; wherein the "1" in the above formulae represents the time unit, therefore, the processing delay may be the time unit as well, and the time unit may be the OFDM symbol, the physical slot, the logical slot, the slot in the resource pool, the physical subframe, the logical subframe, or the subframe in the resource pool, or the ms, etc.

The units of the parameters such as Tproc,0, Tproc,1, and T1 in the above formulae are all the time units defined by the sidelink, for example, the unit may be the OFDM symbol, the physical slot, the logical slot, the slot in the resource pool, the physical subframe, the logical subframe, or the subframe in the resource pool, or the ms, etc.

Therefore, the reference time of the second resource selection window may be any one of: the time of arrival of the service packet, ty0, ty0-Tproc,1, ty0-T1, ty0-(Tproc,0+Tproc,1), ty0-(Tproc,0+T1), ty0−1, ty0-Tproc,1−1, ty0-T1−1, ty0-(Tproc,0+Tproc,1)−1, and ty0-(Tproc,0+T1)−1, wherein the parameters may be other parameter names with different names but having the same value, for example, when the processing delay corresponds to the above T1, T1 may be equivalently expressed as T4 and T4=T1.

Here, it should further be noted that the reference time of the second resource selection window is adopted to determine the second resource selection window, which may be determined by the physical layer of the user equipment itself, or indicated by the MAC layer of the user equipment, or the same as the time of arrival of the service packet, or the same as the triggering time of the resource selection, or the same as a time for performing the resource exclusion determined by the physical layer, or the same as the check time of the resource selection determined by the physical layer, but it is not limited to the above situations.

As an optional implementation, the method further includes:

in a condition that it is determined to perform the partial sensing, after a second time, the resource sensing is continued to be performed till re-evaluation checking and/or preemption checking is/are completed. In this way, the phenomenon of the reliability degradation of data transmission caused by the absence of necessary sensing results is avoided.

Among them, the second time is any one of following items:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Here, it should be further noted that the processing delay may be determined by at least one of the processing time Tproc,0 of the sensing result, the selection and sending time Tproc,1 of the resource, and the parameter T1 for determining the starting time of the second resource selection window. Specifically, the processing delay may be any one of following items: Tproc,1; T1; Tproc,0+Tproc,1; Tproc,0+T1; Tproc,1+1; T1+1; (Tproc,0+Tproc,1)+1; and (Tproc,0+T1)+1; wherein the “1” in the above formulae represents the time unit, therefore, the processing delay may be the time unit as well, and the time unit may be the OFDM symbol, the physical slot, the logical slot, the slot in the resource pool, the physical subframe, the logical subframe, or the subframe in the resource pool, or the ms, etc.

The units of the parameters such as Tproc,0, Tproc,1, and T1 in the above formulae are all the time units defined by the sidelink, for example, the unit may be the OFDM symbol, the physical slot, the logical slot, the slot in the resource pool, the physical subframe, the logical subframe, or the subframe in the resource pool, or the ms, etc.

Therefore, the second time may be any one of: the time of arrival of the service packet, ty0, ty0-Tproc,1, ty0-T1, ty0-(Tproc,0+Tproc,1), ty0-(Tproc,0+T1), ty0−1, ty0-Tproc,1−1, ty0-T1−1, ty0-(Tproc,0+Tproc,1)−1, and ty0-(Tproc,0+T1)−1, wherein the parameters may be other parameter names with different names but having the same value, for example, when the processing delay corresponds to the above T1, T1 may be equivalently expressed as T4 and T4=T1.

The resource selection method in the embodiments of the present disclosure realizes: firstly, when the sending of the periodic service packet is determined by the UE according to the preemption configuration information of the resource pool, the partial sensing is performed on each arrived service packet or the partial sensing is performed on only a part of the service packets; secondly, in a condition that the period configuration signaling dedicated to the partial sensing is configured, the set of periodicity values is determined according to the signaling, so as to determine the partial sensing occasion; and in a condition that the signaling is not configured, the partial sensing occasion is determined according to the periodicity values supported in the resource pool configuration signaling, such that the user equipment may determine the partial sensing occasion as well in a condition that the signaling is not introduced to the user equipment; thirdly, when the UE needs to perform the resource selection when the service packet is arrived, it determine the triggering time of the resource selection or the check time of the resource selection; fourthly, when the UE performs the resource selection or the resource exclusion at the time of arrival of the service packet, the US performs the resource exclusion once more to determine whether the resource reselection is required at the time at which the first candidate time-domain resource is located, or at the time before the time at which the first candidate time-domain resource is located, with consideration of the processing time; fifthly, when the UE performs the resource selection or the resource exclusion at the time of arrival of the service packet, after the UE performs contiguous short-term sensing at the time at which the first candidate time-domain resource is located, or at the time before the time at which the first candidate time-domain resource is located, with consideration of the processing time, the UE performs the resource exclusion once more to determine whether the resource reselection is required; sixthly, the user equipment supports the balance between the power saving and the reliability without a condition that a plurality of interlayer interactions between the MAC layer and the physical layer.

Figure 10:
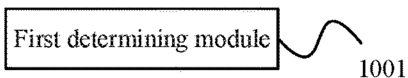
FIG. 10 is a schematic structural diagram of a resource selection apparatus in an embodiment of the present disclosure.

As shown in FIG. 10, an embodiment of the present disclosure further provides a resource selection apparatus, which is applied to the user equipment, and the apparatus includes:

a first determining module 1001, configured to determine whether the resource selection/reselection needs to be triggered in the condition that the service packet is arrived or to be arrived.

In the resource selection apparatus of the embodiments of the present disclosure, the first determining module 1001 determines whether the resource selection/reselection needs to be triggered in the condition that the service packet is arrived or to be arrived, which solves the problem that at present there is no definition of the specific process of the resource selection method under the power-saving requirement, realizes the clarification of the determination process of triggering the resource selection/reselection in the condition that the service packet of the resource is arrived or the service packet is to be arrived under the power-saving mechanism in a process of resource allocation, and realizes the standardization of the process of resource allocation.

The first determining module 1001 is further configured to, in the condition that the service packet is arrived or to be arrived, determine whether to perform the partial sensing; and/or determine the partial sensing occasion.

Optionally, the first determining module 1001 includes:

a first determining submodule, configured to, in the condition that it is determined that the resource selection/reselection needs to be triggered for the service packet, determine to perform the partial sensing; and a second determining submodule, configured to, in the condition that it is determined that the resource selection/reselection does not need to be triggered for the service packet, determine whether to perform the partial sensing according to the preemption configuration information of the resource pool, or according to the preemption configuration information and the priority of the service packet.

Optionally, the second determining submodule is specifically configured to:

determine to perform the partial sensing, in any one of the following conditions:

the preemption configuration information is enabling;

the preemption configuration information is the threshold of the priority;

the preemption configuration information is enabling and the priority of the service packet is determined to be not the highest priority; and the preemption configuration information is the threshold of the priority and the priority of the service packet is determined to be not the highest priority.

Optionally, the second determining submodule is specifically configured to:

determine not to perform the partial sensing in any one of the following conditions:

no preemption configuration information is provided or configured;

the preemption configuration information is disabling;

the preemption configuration information is enabling and the priority of the service packet is determined to be the highest priority; and the preemption configuration information is the threshold of the priority and the priority of the service packet is determined to be the highest priority.

Optionally, the first determining module 1001 further includes:

a third determining submodule, configured to determine the set of periodicity values corresponding to performing the partial sensing; and a fourth determining submodule, configured to determine the resource for performing the partial sensing according to the set of first candidate resources and the set of periodicity values;

wherein the set of first candidate resources includes any one of the following items:

the predetermined Y time-domain candidate resources; and the Y time-domain candidate resources, after the time of arrival of the service packet and closest to the time of arrival of the service packet, obtained by mapping according to the resource reservation period according to the Y time-domain candidate resources determined during the resource selection/reselection having been performed.

Optionally, the fourth determining submodule is specifically configured to:

according to the set of periodicity values, determine that the resource for performing the partial sensing is the resource of the most recent period, corresponding to the set of first candidate resources and before the first time;

wherein the first time is any one of the following items:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Optionally, the third determining submodule is specifically configured to:

determine the set of periodicity values, according to the parameter of the periodicity value for determining the partial sensing occasion, wherein the parameter of the periodicity value is preconfigured, or configured by the network; or in the condition that the parameter of the periodicity value for determining the partial sensing occasion preconfigured, or configured by the network is not obtained, determine the set of periodicity values according to the resource reserve period list information contained in the resource pool configuration parameter.

Optionally, the periodicity values indicated by the parameter of the periodicity value is the subset or all of the periodicity values indicated by the resource reserve period list contained in the resource pool configuration parameter.

The apparatus further includes:

a first performing module, configured to, in the condition that it is determined that the resource selection/reselection needs to be triggered, perform following steps:

determining the first resource selection window at the triggering time of the resource selection; and performing the resource selection within the first resource selection window;

wherein the triggering time of the resource selection is any one of the following items:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Optionally, the starting time of the first resource selection window is m+T1, and the ending time of the first resource selection window is m+T2; or the starting time of the first resource selection window is n+T1, and the ending time of the first resource selection window is n+T2;

wherein m is the triggering time of the resource selection, n is the time of arrival of the service packet, T1 is the parameter for determining the starting time of the first resource selection window, and T2 is the parameter for determining the ending time of the first resource selection window.

Optionally, the first performing module is further configured to:

in the condition that the triggering time of the resource selection is the time of arrival of the service packet, after the resource selection is performed within the first resource selection window, determine the check time of the resource selection, and perform the resource exclusion based on the sensing at the check time of the resource selection; and in the condition that the selected resource is excluded, perform the resource reselection;

wherein the check time of the resource selection is any one of the following items:

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Optionally, the first performing module is further configured to:

perform the contiguous partial sensing before the check time of the resource selection.

Optionally, the first performing module is further configured to:

perform the contiguous partial sensing before the triggering time of the resource selection.

The apparatus is further configured to:

in the condition that it is determined that the resource selection/reselection needs to be triggered, to perform the following steps:

determining the second resource selection window; and performing the resource selection within the second resource selection window.

Optionally, the starting time of the second resource selection window is p+T1, and the ending time of the second resource selection window is p+T2;

wherein p is the reference time of the second resource selection window, T1 is the parameter for determining the starting time of the second resource selection window, and T2 is the parameter for determining the ending time of the second resource selection window;

wherein the reference time of the second resource selection window is any one of the following items:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

The apparatus further includes:

a third performing module, configured to, in the condition that it is determined to perform the partial sensing, after the second time, contiguously perform the resource sensing till the re-evaluation checking and/or the preemption checking is/are completed;

wherein the second time is any one of the following items:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

Figure 11:
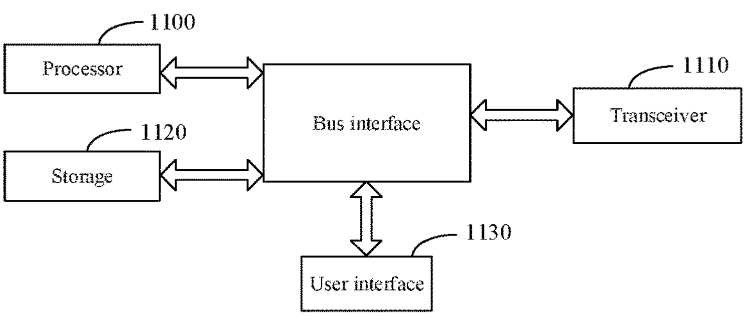
FIG. 11 is a schematic structural diagram of a user equipment in an embodiment of the present disclosure.

As shown in FIG. 11, an embodiment of the present disclosure further provides a user equipment, including: a processor 1100; and a storage 1120 connected to the processor 1100 through a bus interface, wherein the storage 1120 is configured to store a program and data used by the processor 1100 when the processor 1100 executes an operation, and the processor 1100 calls and executes the program and data stored in the storage 1120.

Among them, a transceiver 1110 is connected to the bus interface, and is configured to receive and send the data under control of the processor 1100; and the processor 1100 is configured to read the program in the storage 1120 to perform the following step:

in the condition that the service packet is arrived or to be arrived, determining whether resource selection/reselection needs to be triggered.

In the user equipment of the embodiments of the present disclosure, in the condition that the service packet is arrived or to be arrived, the processor 1100 determines whether the resource selection/reselection needs to be triggered, which solves the problem that at present there is no definition of the specific process of the resource selection method under the power-saving requirement, realizes clarification of the determination process of triggering the resource selection/reselection in the condition that the service packet of the resource is arrived or the service packet is to be arrived under the power-saving mechanism in the process of resource allocation, and realizes the standardization of the process of resource allocation.

Among them, in FIG. 11, an architecture of the bus may include any number of interconnected buses and bridges, specifically, various circuits such as one or more processors represented by the processor 1100 and the storage represented by the storage 1120 are linked together. The architecture of the bus may further link together various other circuits such as peripherals, voltage regulators, and power management circuits, etc., which are well known in the art and therefore will not be further described herein. The bus interface provides an interface. Transceiver 1110 may be a plurality of elements, including a transmitter and a transceiver, providing a unit for communicating with various other devices over a transmission medium. For different terminals, a user interface 1130 may further be an interface capable of connecting externally and internally to required devices, and devices connected thereto include but are not limited to keypads, displays, speakers, microphones, joysticks, and the like. The processor 1100 is responsible for managing the architecture of the bus and general processing, and the storage 1120 may store the data used by the processor 1100 when the processor 1100 executes the operation.

It should be noted that the user equipment provided by the embodiments of the present disclosure is the user equipment capable of performing the above resource selection method, and all embodiments of the above resource selection method are applicable to the user equipment, and may achieve the same or similar beneficial effects.

Those skilled in the art will understand that all or a part of the steps in the above embodiments may be implemented by hardware, or may be completed by instructing relevant hardware through a computer program, and the computer program includes instructions for performing a part or all of the steps of the above methods; and the computer program may be stored in a readable storage medium, and the storage medium may be any form of storage medium.

In addition, an embodiment of the present disclosure further provides a non-transitory computer-readable storage medium, on which the program is stored, and when the program is executed by the processor, the respective processes of the above-mentioned embodiments of the resource selection method are realized, and the same technical effects may be achieved, which will not be repeated here to avoid repetition. Among them, the computer-readable storage medium is, for example, a Read-Only Memory (ROM for short), a Random Access Memory (RAM for short), a magnetic disk or an optical disk, and the like.

In addition, it should be pointed out that, in the apparatus and method of the present disclosure, apparently, the respective components or the respective steps may be decomposed and/or recombined. These decompositions and/or recombinations should be considered equivalents of the present disclosure. Further, the steps for performing the above series of processing may naturally be performed in an order of description or in a chronological order, but not necessarily in the chronological order, and some steps may be performed in parallel or separately of each other. For those of ordinary skill in the art, it may be understood that all or any step or component of the methods and apparatus of the present disclosure may be realized in any computing apparatus (including processors, storage media, etc.) or a network of computing apparatus in a form of hardware, firmware, software or a combination thereof, which may be realized by those skilled in the art by using their basic programming skills after reading the description of the present disclosure.

Therefore, the object of the present disclosure may further be achieved by running the program or a group of programs on any computing apparatus. The computing apparatus may be a known general-purpose apparatus. Therefore, the object of the present disclosure may further be achieved only by providing a program product including program codes for realizing the method or apparatus. That is to say, such a program product constitutes the present disclosure as well, and a storage medium storing such a program product may constitute the present disclosure as well. apparently, the storage medium may be any known storage medium or any storage medium developed in the future.

It should be noted that it should be understood that division of the above modules is only division of logical functions, and may be totally or partially integrated into a physical entity or physically separated, during actual implementation. Further, these modules may all be implemented in a form of calling software through processing elements; they may all be implemented in a form of hardware as well; or some modules may be implemented in the form of calling the software through the processing elements and some modules may be implemented in the form of hardware as well. For example, each determining module may be a separate processing element, and may be realized by being integrated in a certain chip of the above-mentioned apparatus. In addition, each determining module may be stored in the storage of the above-mentioned apparatus in a form of program codes and be called by a certain processing element of the above-mentioned apparatus to execute the functions of the modules identified by the above as well, and implementations of other modules are similar thereto. In addition, all or a part of these modules may be integrated together, and may be realized separately as well. The processing element mentioned here may be an integrated circuit with capability of signal processing. During the implementation, the respective steps of the above method or the respective modules above may be completed by an integrated logic circuit of hardware in a processor element or instructions in the form of software.

For example, the respective modules, units, subunits or submodules may be one or more integrated circuits configured to implement the above method, for example: one or more Application Specific Integrated Circuits (ASIC), or one or more Digital Signal processor (DSP), or one or more Field Programmable Gate Array (FPGA), etc. For another example, when one of the above modules is realized the form of the processing element calling the program codes, the processing element may be the general-purpose processor, such as a Central Processing Unit (CPU) or other processors that may call the program codes. For another example, these modules may be integrated together and realized in a form of a System-On-a-Chip (SOC).

Finally, it should also be noted that, in the context, relational terms such as first and second, etc., are only used to distinguish one entity or operation from another entity or operation, and do not necessarily require or imply that any such actual relationship or order presents in these entities or operations. Furthermore, the term “include”, “including” or any other variation thereof is intended to cover a non-exclusive inclusion, such that a process, method, article, or user equipment including a series of elements not only includes those elements, but also includes other elements not explicitly listed, or includes elements inherent in such process, method, article or equipment. In a condition of no further limitations, an element defined by a phrase “includes a . . . ” does not exclude that, in the process, method, article or apparatus including the mentioned element, additional identical elements are present.

The above descriptions are preferred implementations of the present disclosure. It should be pointed out that those skilled in the art may make some improvements and modifications without departing from a principle of the present disclosure. These improvements and modifications should be regarded as a protection scope of the present disclosure.

The invention claimed is:

1. A method for resource selection, applied to a user equipment, wherein the method comprising:

in a condition that a service packet is arrived or to be arrived, determining whether resource selection/reselection needs to be triggered, wherein the method further comprises: in the condition that the service packet is arrived or to be arrived, determining a partial sensing occasion, wherein the determining the partial sensing occasion, comprises:

determining a set of periodicity values corresponding to performing the partial sensing; and determining a resource for performing the partial sensing according to a set of first candidate resources and the set of periodicity values;

wherein the set of first candidate resources comprises any one of items of:

predetermined Y time-domain candidate resources; and

Y time-domain candidate resources, after a time of arrival of the service packet and closest to the time of arrival of the service packet, obtained by mapping according to a resource reservation period according to Y time-domain candidate resources determined during the resource selection/reselection having been performed, wherein the determining the resource for performing the partial sensing according to the set of first candidate resources and the set of periodicity values, comprises:

according to the set of periodicity values, determining that the resource for performing the partial sensing is a resource of a most recent period, corresponding to the set of first candidate resources and before a first time;

wherein the first time is:

a time obtained by a time ty0, at which a first time-domain candidate resource among the predetermined at least Y time-domain candidate resources is located, minus a processing delay;

wherein the determining the set of periodicity values corresponding to performing the partial sensing, comprises:

determining the set of periodicity values, according to a parameter of a periodicity value for determining the partial sensing occasion, wherein the parameter of the periodicity value is preconfigured, or configured by a network;

in a condition that the parameter of a periodicity value for determining the partial sensing occasion, preconfigured, or configured by the network, is not obtained, determining the set of periodicity values according to resource reserve period list information contained in a resource pool configuration parameter.

2. The method according to claim 1, wherein the determining whether to perform the partial sensing, comprises:

in a condition that it is determined that the resource selection/reselection needs to be triggered for the service packet, determining to perform the partial sensing; and in a condition that it is determined that the resource selection/reselection does not need to be triggered for the service packet, determining whether to perform the partial sensing according to preemption configuration information of a resource pool, or according to the preemption configuration information and a priority of the service packet.

3. The method according to claim 2, wherein the determining whether to perform the partial sensing according to the preemption configuration information of the resource pool or according to the preemption configuration information and the priority of the service packet, comprises:

the partial sensing is determined to be performed in any one of conditions of:

the preemption configuration information is enabling;

the preemption configuration information is a threshold of the priority;

the preemption configuration information is enabling and the priority of the service packet is determined to be not a highest priority; and the preemption configuration information is the threshold of the priority and the priority of the service packet is determined to be not the highest priority.

4. The method according to claim 2, wherein the determining whether to perform the partial sensing according to the preemption configuration information of the resource pool, or according to the preemption configuration information and the priority of the service packet, comprises:

the partial sensing is determined not to be perform in any one of conditions of:

no preemption configuration information is provided or configured;

the preemption configuration information is disabling;

the preemption configuration information is enabling and the priority of the service packet is determined to be a highest priority; and the preemption configuration information is a threshold of the priority and the priority of the service packet is determined to be the highest priority.

5. The method according to claim 1, wherein the set of periodicity values indicated by the parameter of the periodicity value is a subset or all of periodicity values indicated by a resource reserve period list contained in the resource pool configuration parameter.

6. The method according to claim 1, wherein the method further comprises:

in a condition that it is determined that the resource selection/reselection needs to be triggered, performing steps of:

determining a first resource selection window at a triggering time of the resource selection; and performing the resource selection within the first resource selection window;

wherein the triggering time of the resource selection is any one of items of:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

7. The method according to claim 6, wherein a starting time of the first resource selection window is m+T1, and an ending time of the first resource selection window is m+T2; or the starting time of the first resource selection window is n+T1, and the ending time of the first resource selection window is n+T2;

wherein m is the triggering time of the resource selection, n is the time of arrival of the service packet, T1 is a parameter for determining the starting time of the first resource selection window, and T2 is a parameter for determining the ending time of the first resource selection window.

8. The method according to claim 6, wherein in a condition that the triggering time of the resource selection is the time of arrival of the service packet, after the resource selection is performed within the first resource selection window, the method further comprises:

determining a check time of the resource selection, and performing resource exclusion based on sensing at the check time of the resource selection; and in a condition that a selected resource is excluded, performing the resource reselection;

wherein the check time of the resource selection is any one of items of:

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

9. The method according to claim 8, wherein the method further comprises:

performing contiguous partial sensing before the check time of the resource selection.

10. The method according to claim 6, wherein the method further comprises:

performing contiguous partial sensing before the triggering time of the resource selection.

11. The method according to claim 1, wherein the method further comprises:

in a condition that it is determined that the resource selection/reselection needs to be triggered, performing steps of:

determining a second resource selection window; and performing the resource selection within the second resource selection window.

12. The method according to claim 11, wherein a starting time of the second resource selection window is p+T1, and an ending time of the second resource selection window is p+T2;

wherein p is a reference time of the second resource selection window, T1 is a parameter for determining the starting time of the second resource selection window, and T2 is a parameter for determining the ending time of the second resource selection window;

wherein the reference time of the second resource selection window is any one of items of:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

13. The method according to claim 1, wherein the method further comprises:

in a condition that it is determined to perform the partial sensing, after a second time, contiguously perform resource sensing till re-evaluation checking and/or preemption checking is/are completed;

wherein the second time is any one of items of:

the time of arrival of the service packet;

the time ty0 at which the first time-domain candidate resource among the predetermined at least Y time-domain candidate resources is located; and the time obtained by the time ty0, at which the first time-domain candidate resource among the predetermined at least Y time-domain candidate resources is located, minus the processing delay.

14. A user equipment, comprising: a transceiver, a storage, a processor, and a computer program stored on the storage and capable of running on the processor, wherein, when the processor executes the computer program, the processor implements the method for resource selection according to claim 1.

15. A non-transitory computer-readable storage medium, on which a computer program is stored, wherein, when the computer program is executed by a processor, the processor implements the method for resource selection according to claim 1.

* * * * *